United States Patent
Jiang et al.

(10) Patent No.: US 12,152,810 B2
(45) Date of Patent: Nov. 26, 2024

(54) HEAT-PIPE TYPE HEAT EXTRACTION INTEGRATED WITH COMBINED COOLING POWER AND HEATING EXPLOITATION-UTILIZATION INTEGRATED GEOTHERMAL SYSTEM

(71) Applicant: GUANGZHOU INSTITUTE OF ENERGY CONVERSION, CHINESE ACADEMY OF SCIENCES, Guangzhou (CN)

(72) Inventors: Fangming Jiang, Guangzhou (CN); Juanwen Chen, Guangzhou (CN); Wenbo Huang, Guangzhou (CN); Jiwen Cen, Guangzhou (CN); Wenjiong Cao, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 213 days.

(21) Appl. No.: 18/012,994

(22) PCT Filed: Sep. 14, 2021

(86) PCT No.: PCT/CN2021/118084
§ 371 (c)(1),
(2) Date: Dec. 27, 2022

(87) PCT Pub. No.: WO2022/033604
PCT Pub. Date: Feb. 17, 2022

(65) Prior Publication Data
US 2023/0250998 A1    Aug. 10, 2023

(30) Foreign Application Priority Data
Sep. 25, 2020 (CN) .......................... 202011026471.1

(51) Int. Cl.
*F24T 10/40* (2018.01)
*F24T 50/00* (2018.01)

(52) U.S. Cl.
CPC .............. *F24T 10/40* (2018.05); *F24T 50/00* (2018.05)

(58) Field of Classification Search
CPC ........... F24T 10/40; F24T 50/00; F01D 15/10; F01K 13/00
(Continued)

(56) References Cited

U.S. PATENT DOCUMENTS 4,047,093 A * 9/1977 Levoy ..................... F24T 10/20
976/DIG. 417
4,793,146 A * 12/1988 Ryokai ..................... F25D 1/00
165/45
(Continued)

FOREIGN PATENT DOCUMENTS

CN    101055121 A    10/2007
CN    101737995 A    6/2010
(Continued)

*Primary Examiner* — Jon T. Schermerhorn, Jr.
(74) *Attorney, Agent, or Firm* — Bayramoglu Law Offices LLC

(57) ABSTRACT

A heat-pipe type heat extraction integrated with combined cooling power and heating exploitation-utilization integrated geothermal system includes an underground heat pipe, a steam pump, a first absorption bed, a second absorption bed, a first condenser, an electronic expansion valve, an evaporator, a liquid storage tank, a balance valve, a steam turbine, an generator connected to the steam turbine, a second condenser, a heat utilization device connected to the second condenser, a pressurizing pump connected to the second condenser, and relevant linkage valve assemblies. The system controls a flow direction and a flow rate after heat pipe steam is extracted from the ground through the steam pump and the regulating valves on the refrigeration (Continued)

side and the power generation side, so as to select the refrigeration/electric heating single-mode heat utilization or adjust flow distribution during refrigeration/electric heating dual-mode combined use.

7 Claims, 2 Drawing Sheets

(58) Field of Classification Search
USPC .......................................................... 165/45
See application file for complete search history.

(56) References Cited

U.S. PATENT DOCUMENTS

| | | | | |
|---|---|---|---|---|
| 10,295,206 | B2 * | 5/2019 | Zhang | F25B 23/006 |
| 10,578,369 | B1 * | 3/2020 | Johnson | F28D 20/003 |
| 10,663,232 | B2 * | 5/2020 | Rao | F28D 20/021 |
| 11,150,029 | B1 * | 10/2021 | Johnson | C09K 5/16 |
| 11,187,450 | B2 * | 11/2021 | Ros | F25D 3/08 |
| 11,359,338 | B2 * | 6/2022 | Parrella | F24D 3/12 |
| 11,512,402 | B2 * | 11/2022 | Bairamijamal | C07C 41/01 |
| 11,920,832 | B2 * | 3/2024 | Ros | F25D 11/00 |
| 2013/0152612 | A1 | 6/2013 | Smith et al. | |
| 2014/0202661 | A1 * | 7/2014 | Goenka | B60H 1/00335 |
| | | | | 165/104.13 |
| 2018/0224215 | A1 * | 8/2018 | Thiers | F28D 15/0275 |

FOREIGN PATENT DOCUMENTS

| | | |
|---|---|---|
| CN | 103147945 A | 6/2013 |
| CN | 104989474 A | 10/2015 |
| CN | 106288496 A | 1/2017 |
| CN | 107144035 A | 9/2017 |
| CN | 109253559 A | 1/2019 |
| CN | 110030746 A | 7/2019 |

* cited by examiner

HEAT-PIPE TYPE HEAT EXTRACTION INTEGRATED WITH COMBINED COOLING POWER AND HEATING EXPLOITATION-UTILIZATION INTEGRATED GEOTHERMAL SYSTEM

CROSS REFERENCE TO THE RELATED APPLICATIONS

This application is the national phase entry of International Application No. PCT/CN2021/118084, filed on Sep. 14, 2021, which is based upon and claims priority to Chinese Patent Application No. 202011026471.1, filed on Sep. 25, 2020, the entire contents of which are incorporated herein by reference.

TECHNICAL FIELD

The present invention relates to the technical field of development and utilization of geothermal energy, in particular to a heat-pipe type heat extraction integrated with combined cooling power and heating exploitation-utilization integrated geothermal system.

BACKGROUND

Geothermal energy is a clean and renewable energy, and development and utilization of the geothermal energy have gradually become one of strategic directions of new energy development in countries around the world. At present, the development of geothermal resources has been developed from middle-shallow layers of hydrothermal resources to the deeper occurrence strata such as middle-deep layers of geothermal and hot dry rock resources with higher temperature, larger reserves and wider distribution. The development direction of the development and utilization of the geothermal resources has also expanded from the heating utilization modes such as heating and bathing to the utilization modes such as refrigeration supply, power supply and the like of geothermal refrigeration and power generation.

For the traditional geothermal exploitation mode, usually underground hot water, or a fluid working medium injected into an underground thermal storage is extracted as a heat-carrying working medium for geothermal exploitation, which not only needs to consume additional pumping power, but also has the problems such as loss of the working medium, pipeline scaling and groundwater recharge. In recent years, the geothermal energy development mode of "extracting heat without taking water" has become a new technological development direction.

The heat pipe is one of elements with the highest heat transfer efficiency known at present. Through a gas-liquid phase change of the working medium in the heat pipe, the heat can be rapidly transferred from the underground high-temperature thermal storage to the ground surface. Compared with conventional geothermal exploitation solutions, the use of the heat pipe to exploit thermal energy in the underground thermal storage does not need to consume additional pumping power. At the same time, since the heat-carrying working medium is only cycled in the pipe, the problems such as the loss of the working medium, the pipeline scaling and groundwater recharge can be effectively avoided. In the heat pipe used for exploitation of the geothermal heat, the working medium is heated by the underground heat storage to form a steam flow which flows upward along the heat pipe, is condensed into a liquid phase after passing through a ground surface heat utilization component and returns to an evaporation section. The steam generated in the heat pipe is used as a cycle working medium, and a power generation cycle can be carried out without flashing. Compared with a liquid working medium, the steam working medium is of high grade and has a higher available energy density. Therefore, compared with other geothermal exploitation technologies extracting underground hot water or injection-produced hot water for thermal utilization, the technical solution using the steam generated by the heat pipe for refrigeration and power generation has more prospects for comprehensive development and utilization. At present, there is still no corresponding comprehensive technical solution for combined cooling power and heating for the new technology of exploiting the geothermal energy with the heat pipe.

SUMMARY

An object of the present invention is to overcome the above deficiencies of prior art, and to provide a heat-pipe type heat extraction integrated with combined cooling power and heating exploitation-utilization integrated geothermal system.

The present invention is achieved through the following technical solutions: a heat-pipetype heat extraction integrated with combined cooling power and heating exploitation-utilization integrated geothermal system includes an underground heat pipe, a steam pump, a first absorption bed, a second absorption bed, a first condenser, an electronic expansion valve, an evaporator, a liquid storage tank, a balance valve, a steam turbine, a generator connected to the steam turbine, a second condenser, a heat utilization equipment connected to the second condenser, a pressurizing pump connected to the second condenser, and relevant linkage valve assemblies; the underground heat pipe includes an evaporation section, an adiabatic section and a reflux section, the evaporation section is located in an underground high-temperature thermal storage; the top of the reflux section is located on the ground, and is provided with a suction hole, a steam outlet and a backflow liquid inlet; the underground heat pipe uses at least one of water, carbon dioxide, ammonia, and organic working medium as a heat-carrying working medium, or the underground heat pipe uses nanofluid formed by adding metal oxide nanoparticles to at least one of water, carbon dioxide, ammonia, and organic working medium as a heat-carrying working medium; the steam outlet of the underground heat pipe is connected to the steam pump, the backflow liquid inlet of the underground heat pipe is connected to the liquid storage tank; the first absorption bed, the second absorption bed and the steam turbine are all connected to an outlet of the steam pump, a steam outlet of the steam turbine is connected to the second condenser; the first absorption bed, the second absorption bed and the pressurizing pump are connected to the liquid storage tank; the first condenser, the electronic expansion valve and the evaporator are connected end-to-end in sequence, the first absorption bed and the second absorption bed are respectively connected to the first condenser; an outlet of the evaporator is connected to the first absorption bed and the second absorption bed respectively; and the first absorption bed is connected to the second absorption bed through the balance valve.

The system of the present invention can utilize the high-temperature steam working medium generated by a heat-pipe type geothermal exploitation system, control an energy transport path and a flow rate of the steam through multiple valve assemblies, and realize the dual-mode heat utilization of continuous refrigeration and steam power generation. At the same time, through the control on a reflux flow of a liquid state working medium of the heat pipe, a liquid filling amount in the heat pipe can be adjusted in time, so that the heat pipe works in the best operating state, stable and efficient extraction and development and utilization of the geothermal energy are realized, and clean and environment-friendly refrigeration capacity, electric quantity and quantity of heat are provided for ground buildings and other public facilities.

The outlet of the steam pump is divided into two paths, one path is connected to a refrigeration circuit side, and the other path is connected to a power generation cycle side; the relevant linkage valve assemblies include a first regulating valve, a second regulating valve, a third regulating valve, a fourth regulating valve, a fifth regulating valve, a sixth regulating valve, a seventh regulating valve, a first switching valve, a second switching valve, a third switching valve, a fourth switching valve, a fifth switching valve, a sixth switching valve, a seventh switching valve, an eighth switching valve and a ninth switching valve; the first absorption bed, the second absorption bed, the first condenser, the electronic expansion valve, the evaporator, the liquid storage tank, the balance valve, the second regulating valve, the first switching valve, the second switching valve, the third switching valve, the fourth regulating valve, the fourth switching valve, the third regulating valve, the fifth switching valve, the sixth switching valve, the seventh switching valve, the fifth regulating valve and the eighth switching valve form the refrigeration circuit side; each of the first absorption bed and the second absorption bed is provided with a heat exchange working medium flow channel and a refrigerant flow channel; the heat exchange working medium flow channel of the first absorption bed is provided with two inlets, one inlet is connected to the outlet of the steam pump through the second regulating valve, and the other inlet is connected to a cooling water pipeline through the eighth switching valve; the heat exchange working medium flow channel of the first absorption bed is provided with two outlets, one outlet is connected to the liquid storage tank through the first switching valve, and the other outlet is connected to a cooling water discharge pipeline through the fifth regulating valve; the heat exchange working medium flow channel of the second absorption bed is provided with two inlets, one inlet is connected to the outlet of the steam pump through the third regulating valve, and the other inlet is connected to the cooling water pipeline through the fifth regulating valve; the heat exchange working medium flow channel of the second absorption bed is provided with two outlets, one outlet is connected to the liquid storage tank through the fifth switching valve, and the other outlet is connected to the cooling water discharge pipeline through the fourth regulating valve; the refrigerant flow channel of the first absorption bed is provided with two refrigerant inlets/outlets, one inlet/outlet is connected to the first condenser through the second switching valve, and the other inlet/outlet is connected to the evaporator through the seventh switching valve; the refrigerant flow channel of the second absorption bed is provided with two refrigerant inlets/outlets, one inlet/outlet is connected to the first condenser through the sixth switching valve, and the other inlet/outlet is connected to the evaporator through the third switching valve; an outlet of the liquid storage tank is connected to the backflow liquid inlet of the underground heat pipe through the first regulating valve; the second regulating valve, the first switching valve, the second switching valve, the third switching valve, the fourth regulating valve and the fourth switching valve are marked as A group valves; the third regulating valve, the fifth switching valve, the sixth switching valve, the seventh switching valve, the fifth regulating valve and the eighth switching valve are marked as B group valves; when a refrigeration cycle does not work, the A group valves and the B group valves are all closed; when the refrigeration cycle works, the A group valves and the B group valves are set according to a program, and when one group is open, the other group is closed; when the A group valves are opened, the B group valves are closed, steam generated by the underground heat pipe firstly enters the first absorption bed through the second regulating valve, releases heat to be condensed into a liquid state, flows into the liquid storage tank through the first switching valve, and finally returns to the underground heat pipe through the first regulating valve, at the same time, a refrigeration medium of the first absorption bed absorbs heat to separate out high-temperature refrigerant steam, which enters the first condenser through the second switching valve to release heat for condensation, forms a high-pressure liquid state, the high-pressure liquid state is depressurized through the electronic expansion valve, enters the evaporator to absorb heat for refrigeration, then it is vaporized into a gaseous state, and finally flows to the second absorption bed through the third switching valve to be absorbed for heat release, cooling water flowing in through the fourth regulating valve is heated, and the cooling water is heated and then flows out from the fourth switching valve; when a concentration of the first absorption bed is less than a set value X of the absorption bed, the A group valves are closed, the B group valves are opened, the steam generated by the underground heat pipe firstly enters the second absorption bed through the third regulating valve, releases heat to be condensed into a liquid state, flows into the liquid storage tank through the fifth switching valve, and finally returns to the underground heat pipe through the first regulating valve, at the same time, the refrigeration medium of the second absorption bed absorbs heat to separate out high-temperature refrigerant steam, which enters the first condenser through the sixth switching valve to release heat for condensation, forms a high-pressure liquid state, the high-pressure liquid state is depressurized through the electronic expansion valve, enters the evaporator to absorb heat for refrigeration, then it is vaporized into a gaseous state, and finally flows to the first absorption bed through the seventh switching valve to be absorbed for heat release, and cooling water flowing in through the fifth regulating valve is heated, and the cooling water is heated and then flows out from the eighth switching valve.

The steam turbine, the generator, the second condenser, the heat utilization equipment, the seventh regulating valve, the ninth switching valve and the pressurizing pump form the power generation cycle side; the outlet of the steam pump is connected to the steam turbine through the sixth regulating valve; a cooling water inlet of the second condenser is connected to an outlet of the heat utilization equipment through the seventh regulating valve, and a cooling water outlet of the second condenser is connected to an inlet of the heat utilization equipment through the ninth switching valve; and a condensed water outlet of the second condenser is connected to the liquid storage tank through the pressurizing pump.

The system uses a working medium steam generated in the underground heat pipe as a cycle working medium to perform refrigeration and electric heating dual-mode heat utilization; after the underground heat pipe absorbs heat of the high-temperature thermal storage, the generated working medium steam is divided into two paths, one path is a power generation side steam circuit, the other path is a refrigeration side steam circuit, and the steam in the power generation side steam circuit enters the steam turbine through the sixth regulating valve for expansion work so as to drive the generator to generate electricity, and is condensed by the second condenser and pressurized by the pressurizing pump and then collected in the liquid storage tank; the steam in the refrigeration side steam circuit enters the first absorption bed through the second regulating valve, or after entering the second absorption bed through the third regulating valve, the steam is condensed in the absorption bed for heat release, and heats the refrigeration medium of the absorption bed, so that a refrigerant is subjected to desorption and the refrigerant is driven to pass through the refrigeration cycle; the working medium steam is condensed into the liquid state and then collected in the liquid storage tank; steam condensate of the power generation side steam circuit and steam condensate of the refrigeration side steam circuit are both collected in the liquid storage tank, and then enter the backflow liquid inlet through the first regulating valve and return to the underground heat pipe.

The system changes a flow direction of the steam working medium and the refrigerant by controlling on-off of the valve assemblies to realize continuous absorption type refrigeration by using heat pipe steam; the A group valves and the B group valves are subjected to program settings: when the refrigeration cycle is closed, the A group valves and the B group valves are closed; when the refrigeration cycle works, an opening and closing relationship between the A group valves and the B group valves is determined by concentrations of the two absorption beds, when the A group valves are opened and the B group valves are closed, if the refrigerant concentration of the second absorption bed is greater than the refrigerant concentration of the first absorption bed by the set value X, then the B group valves are opened and the A group valves are closed; when the B group valves are opened and the A group valves are closed, if the refrigerant concentration of the first absorption bed is greater than the refrigerant concentration of the second absorption bed by the set value X, then the A group valves are opened and the B group valves are closed; the X value is set according to requirements of the refrigeration system; when the A group valves are opened and the B group valves are closed, the steam generated by the underground heat pipe heats the first absorption bed, the high-temperature refrigerant steam is separated out from the first absorption bed, the refrigerant concentration in the bed continuously decreases, at the same time, the cooling water cools the second absorption bed, the refrigerant steam is absorbed in the second absorption bed, and the refrigerant concentration in the bed continuously increases; when the concentration of the first absorption bed is reduced to be less than a set value of the second absorption bed, the A group valves are closed, the B group valves are opened, the steam generated by the underground heat pipe heats the second absorption bed, the high-temperature refrigerant steam is separated out from the second absorption bed, the refrigerant concentration in the bed continuously decreases, at the same time, the cooling water cools the first absorption bed, the refrigerant steam is absorbed in the first absorption bed, and the refrigerant concentration in the bed continuously increases; when the concentration of the second absorption bed is reduced to be less than a set value of the first absorption bed, the A group valves are opened, the B group valves are closed, and the cycle is repeated; and the balance valve between the first absorption bed and the second absorption bed is used to adjust liquid levels and a concentration balance of the two absorption beds, and is closed when the refrigeration system works. The refrigeration cycle on the refrigeration circuit side is capable of being designed and calculated according to geothermal conditions and user requirements, and an absorption type refrigeration cycle or an adsorption type refrigeration cycle is selected; the adsorption type refrigeration cycle includes a single-effect adsorption type refrigeration cycle, a dual-effect adsorption type refrigeration cycle or a multi-effect adsorption type refrigeration cycle; the absorption type refrigeration cycle includes a single-effect absorption type refrigeration cycle, a dual-effect absorption type refrigeration cycle or a multi-effect absorption type refrigeration cycle; when the absorption type refrigeration cycle is used, the first absorption bed and the second absorption bed use a liquid absorbent-refrigerant combination as a refrigeration medium pair, and working media of the first absorption bed and the second absorption bed are a working medium pair formed by the refrigerant used to prepare the refrigeration capacity and an absorbent used to absorb and desorb the refrigerant. The absorbent includes at least one of lithium bromide, lithium chloride, lithium iodide, calcium chloride, ethylamine, methylamine, sodium thiocyanate, tetraethanol dimethyl ether or water, and the refrigerant includes water, ammonia, carbon dioxide, R134a, R12, R22 or methanol. When the adsorption type refrigeration cycle is used, each of the first absorption bed and the second absorption bed is an adsorption bed, the two absorption beds use a solid adsorbent-refrigerant combination as a refrigeration medium pair, the working media include the refrigerant used to prepare the refrigeration capacity and a solid adsorbent used to absorb or desorb the refrigerant, and the two form a working medium pair. The refrigerant includes water, ammonia, carbon dioxide, R134a, R12, R22 or methanol, and the solid adsorbent includes at least one of silica gel, activated alumina, zeolite molecular sieve, activated carbon or calcium chloride.

The heat utilization equipment performs an open or closed cycle with the water as a cooling liquid working medium.

Compared with the prior art, the advantages of the present invention are:

1. in the present invention, the high-grade steam working medium generated by a phase change action in the heat pipe is used to directly drive the refrigeration cycle and the power generation cycle of the steam turbine, the exploitation and utilization of the geothermal resources is spontaneously realized, and auxiliary power is not needed to maintain system operation; during operation of the system, the heat-carrying working medium of the heat pipe is coupled with underground and ground thermodynamic cycles, and the whole process is a closed cycle and is not in contact with rocks and ambient air, thereby avoiding the problems such as loss of the working medium, pipeline scaling and environmental pollution.

2. The present invention realizes the switching of a single working mode of power generation/refrigeration and the adjustment of power distribution under dual working modes through a linkage design of the valve assemblies.

3. The present invention controls the flow direction switching of two fluid working media, that is, the heat-carrying working medium and the refrigeration working medium, through the linkage design of the valve assemblies, and realizes continuous utilization of the heat pipe steam by the absorption type refrigeration system, which not only realizes the continuous stability of heat pipe steam refrigeration and simultaneously also avoids unstable operation of the heat pipe caused by fluctuation of a refrigeration cycle load, thereby effectively avoiding the problem of oscillation of the thermal system caused by mismatch of energy supply and consumption.

4. The present invention can realize flow distribution of the steam by controlling the regulating valves on the refrigeration side and the power generation side in combination with the steam pump, so as to adjust a refrigeration capacity and a power generation capacity; through the backflow liquid flow regulating valve, the operation state in the heat pipe can be adjusted according to an actual load for supply and consumption matching, and the amount of liquid injection in the pipe is adjusted to achieve no liquid accumulation and no dry burning in the pipe, and to maintain film boiling with higher thermal conductivity and stability, thereby finally maximizing the efficiency of geothermal exploitation and utilization.

Meanings of the reference signs in the figures: 1, underground heat pipe; 2, steam pump; 3, first absorption bed; 4, second absorption bed; 5, first condenser; 6, electronic expansion valve; 7, evaporator; 8, liquid storage tank; 9, first regulating valve; 10, balance valve; 11, steam turbine; 12, generator; 13, second condenser; 14, heat utilization equipment; 15, pressurizing pump; 111, second regulating valve 112, first switching valve; 113, second switching valve; 114, third switching valve; 115, fourth regulating valve; 116, fourth switching valve; 121, third regulating valve; 122, fifth switching valve; 123, sixth switching valve; 124, seventh switching valve; 125, fifth switching valve; 126, eighth switching valve; 201, sixth regulating valve; 202, seventh regulating valve; 203, ninth switching valve.

DETAILED DESCRIPTION OF THE EMBODIMENTS

The content of the present invention will be further described in detail below in combination with the accompanying drawings and specific embodiments.

Embodiments

Figure 1:
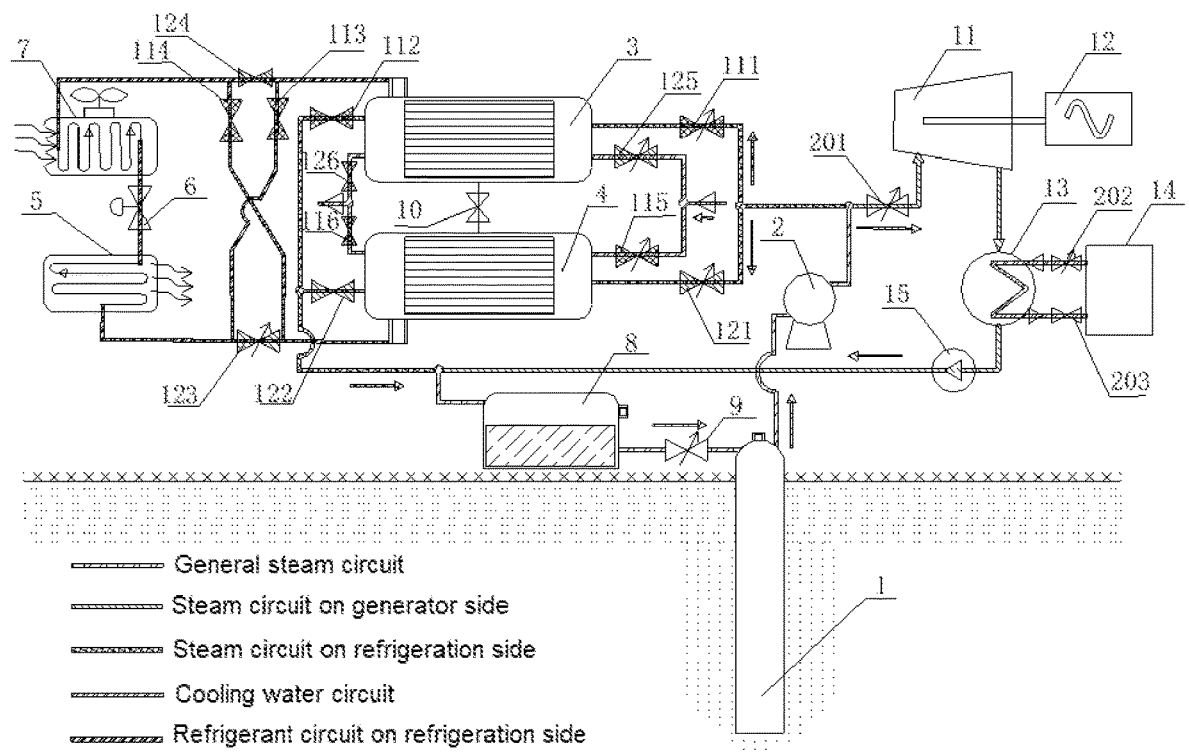
FIG. 1 is a schematic structural diagram according to an embodiment of the present invention.
Figure 2:
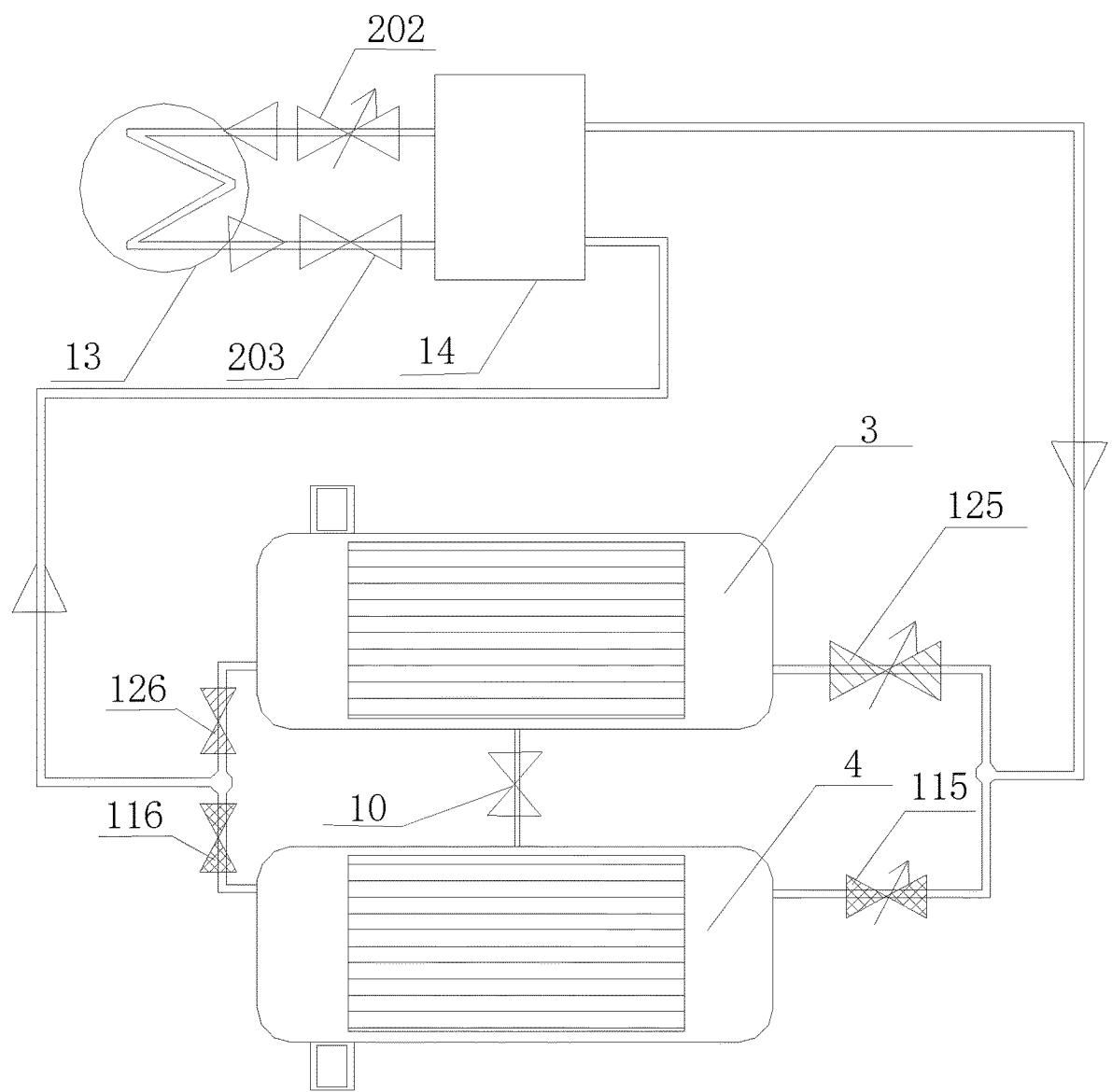
FIG. 2 is a schematic diagram of a system structure that absorption beds and a second condenser share a heat utilization equipment according to an embodiment of the present invention.

Referring to FIG. 1 and FIG. 2, which show a heat-pipe type heat extraction integrated with combined cooling power and heating exploitation-utilization integrated geothermal system, including an underground heat pipe 1, a steam pump 2, a first absorption bed 3, a second absorption bed 4, a first condenser 5, an electronic expansion valve 6, an evaporator 7, a liquid storage tank 8, a balance valve 10, a steam turbine 11, a generator 12 connected to the steam turbine 11, a second condenser 13, a heat utilization equipment 14 connected to the second condenser 13, a pressurizing pump 15 connected to the second condenser 13, and relevant linkage valve assemblies; the underground heat pipe 1 includes an evaporation section, an adiabatic section and a reflux section, and the evaporation section is located in an underground high-temperature thermal storage; the top of the reflux section is located on the ground, and is provided with a suction hole, a steam outlet and a backflow liquid inlet; the underground heat pipe 1 uses at least one of water, carbon dioxide, ammonia, and an organic working medium as a heat-carrying working medium, or the underground heat pipe 1 uses nanofluid formed by adding metal oxide nanoparticles to at least one of water, carbon dioxide, ammonia, and an organic working medium as a heat-carrying working medium; the steam outlet of the underground heat pipe 1 is connected to the steam pump 2, and the backflow liquid inlet of the underground heat pipe 1 is connected to the liquid storage tank; the first absorption bed 3, the second absorption bed 4, and the steam turbine 11 are all connected to an outlet of the steam pump 2, and a steam outlet of the steam turbine 11 is connected to the second condenser 13; the first absorption bed 3, the second absorption bed 4 and the pressurizing pump 15 are connected to the liquid storage tank; the first condenser 5, the electronic expansion valve 6, and the evaporator 7 are connected end-to-end in sequence, and the first absorption bed 3 and the second absorption bed 4 are respectively connected to the first condenser 5; an outlet of the evaporator 7 is connected to the first absorption bed 3 and the second absorption bed 4 respectively; and the first absorption bed 3 is connected to the second absorption bed 4 through the balance valve 10.

The system can utilize the high-temperature steam working medium generated by a heat-pipe type geothermal exploitation system, control an energy transport path and a flow rate of the steam through multiple valve assemblies, and realize the dual-mode heat utilization of continuous refrigeration and steam power generation. At the same time, through the control on a reflux flow of a liquid state working medium of the heat pipe, a liquid filling amount in the heat pipe can be adjusted in time, so that the heat pipe works in the best operating state, stable and efficient extraction and development and utilization of the geothermal energy are realized, and clean and environment-friendly refrigeration capacity, electric quantity and quantity of heat are provided for ground buildings and other public facilities. In this system, "exploitation" refers to geothermal exploitation, and the system mainly relies on a heat pipe technology to realize geothermal exploitation and heat extraction; and "utilization" refers to utilization of the geothermal energy; and the system realizes the combined use of cooling power and heating through other equipment (ground equipment) other than the underground heat pipe.

The outlet of the steam pump 2 is divided into two paths, one path is connected to a refrigeration circuit side, and the other path is connected to a power generation cycle side; the relevant linkage valve assemblies include a first regulating valve 9, a second regulating valve 111, a third regulating valve 121, a fourth regulating valve 115, a fifth regulating valve 125, a sixth regulating valve 201, a seventh regulating valve 202, a first switching valve 112, a second switching valve 113, a third switching valve 114, a fourth switching valve 116, a fifth switching valve 122, a sixth switching valve 123, a seventh switching valve 124, an eighth switching valve 126 and a ninth switching valve 203; the first absorption bed 3, the second absorption bed 4, the first condenser 5, the electronic expansion valve 6, the evaporator 7, the liquid storage tank 8, the balance valve 10, the second regulating valve 111, the first switching valve 112, the second switching valve 113, the third switching valve 114, the fourth regulating valve 115, the fourth switching valve 116, the third regulating valve 121, the fifth switching valve 122, the sixth switching valve 123, the seventh switching valve 124, the fifth regulating valve 125 and the eighth switching valve 126 form the refrigeration circuit side; each of the first absorption bed 3 and the second absorption bed 4 is provided with a heat exchange working medium flow channel and a refrigerant flow channel; the heat exchange working medium flow channel of the first absorption bed 1 is provided with two inlets, one inlet is connected to the outlet of the steam pump 2 through the second regulating valve 111, and the other inlet is connected to a cooling water pipeline through the eighth switching valve 126; the heat exchange working medium flow channel of the first absorption bed 3 is provided with two outlets, one outlet is connected to the liquid storage tank 8 through the first switching valve 112, and the other outlet is connected to a cooling water discharge pipeline through the fifth regulating valve 125; the heat exchange working medium flow channel of the second absorption bed 4 is provided with two inlets, one inlet is connected to the outlet of the steam pump 2 through the third regulating valve 121, and the other inlet is connected to the cooling water pipeline through the fifth regulating valve 125; the heat exchange working medium flow channel of the second absorption bed 4 is provided with two outlets, one outlet is connected to the liquid storage tank 8 through the fifth switching valve 122, and the other outlet is connected to the cooling water discharge pipeline through the fourth regulating valve 115; the refrigerant flow channel of the first absorption bed 3 is provided with two refrigerant inlets/outlets, one inlet/outlet is connected to the first condenser 5 through the second switching valve 113, and the other inlet/outlet is connected to the evaporator 7 through the seventh switching valve 124; the refrigerant flow channel of the second absorption bed 4 is provided with two refrigerant inlets/outlets, one inlet/outlet is connected to the first condenser 5 through the sixth switching valve 123, and the other inlet/outlet is connected to the evaporator 7 through the third switching valve 114; an outlet of the liquid storage tank is connected to the liquid return inlet of the underground heat pipe 1 through the first regulating valve 9; the second regulating valve 111, the first switching valve 112, the second switching valve 113, the third switching valve 114, the fourth regulating valve 115 and the fourth switching valve 116 are marked as A group valves; the third regulating valve 121, the fifth switching valve 122, the sixth switching valve 123, the seventh switching valve 124, the fifth regulating valve 125 and the eighth switching valve 126 are marked as B group valves; when a refrigeration cycle does not work, the A group valves and the B group valves are all closed; when the refrigeration cycle works, the A group valves and the B group valves are set according to a program, and when one group is open, the other group is closed; when the A group valves are opened, the B group valves are closed, steam generated by the underground heat pipe 1 firstly enters the first absorption bed 3 through the second regulating valve 111, releases heat to be condensed into a liquid state, flows into the liquid storage tank 8 through the first switching valve 112, and finally returns to the underground heat pipe 1 through the first regulating valve 9, at the same time, a refrigeration medium of the first absorption bed 3 absorbs heat to separate out high-temperature refrigerant steam, which enters the first condenser 5 through the second switching valve 113 to release heat for condensation, forms a high-pressure liquid state, the high-pressure liquid state is depressurized through the electronic expansion valve 6, enters the evaporator 7 to absorb heat for refrigeration, then it is vaporized into a gaseous state, and finally flows to the second absorption bed 4 through the third switching valve 114 to be absorbed for heat release, cooling water flowing in through the fourth regulating valve 115 is heated, and the cooling water is heated and then flows out from the fourth switching valve 116; when a concentration of the first absorption bed 3 is less than a set value X of the absorption bed, the A group valves are closed, the B group valves are opened, the steam generated by the underground heat pipe 1 firstly enters the second absorption bed 4 through the third regulating valve 121, releases heat to be condensed into a liquid state, flows into the liquid storage tank 8 through the fifth switching valve 122, and finally returns to the underground heat pipe 1 through the first regulating valve 9, at the same time, the refrigeration medium of the second absorption bed 4 absorbs heat to separate out high-temperature refrigerant steam, which enters the first condenser 5 through the sixth switching valve 123 to release heat for condensation, forms a high-pressure liquid state, the high-pressure liquid state is depressurized through the electronic expansion valve 6, enters the evaporator 7 to absorb heat for refrigeration, then it is vaporized into a gaseous state, and finally flows to the first absorption bed 3 through the seventh switching valve 124 to be absorbed for heat release, and cooling water flowing in through the fifth regulating valve 125 is heated, and the cooling water is heated and then flows out from the eighth switching valve 126. In the present embodiment, a numerical value range of the set value X is 0 to ±100000 ppm.

In the present embodiment, the steam pump 2 is used to adjust a total steam volume and pressure of the refrigeration and power generation cycles, thereby changing a steam pressure difference and a rising rate in the heat pipe; the valve assemblies on the refrigeration side are used to adjust the steam flow and pressure on the refrigeration circuit side, so as to control an evaporation rate of the refrigerants in the absorption beds to adjust the refrigeration capacity; the valve assemblies on the power generation side are used to adjust the steam flow and pressure on the power generation circuit side so as to control power generation power. When the heat pipe uses a high-pressure working medium, there is no need for pumping, the steam pump 2 can be omitted, and the pressure and flow of the two cycles are directly adjusted by the regulating valve assemblies on the refrigeration side and the regulating valves on the power generation side.

The steam turbine 11, the generator 12, the second condenser 13, the heat utilization equipment 14, the seventh regulating valve 202, the ninth switching valve 203, and the pressurizing pump 15 form the power generation cycle side; the outlet of the steam pump 2 is connected to the steam turbine 11 through the sixth regulating valve 201; a cooling water inlet of the second condenser 13 is connected to an outlet of the heat utilization equipment 14 through the seventh regulating valve 202, and a cooling water outlet of the second condenser 13 is connected to an inlet of the heat utilization equipment 14 through the ninth switching valve 203; and a condensed water outlet of the second condenser 13 is connected to the liquid storage tank through the pressurizing pump 15.

The system uses a working medium steam generated in the underground heat pipe 1 as a cycle working medium to perform refrigeration and electric heating dual-mode heat utilization; after the underground heat pipe 1 absorbs heat of the high-temperature thermal storage, the generated working medium steam is divided into two paths, one path is a power generation side steam circuit, the other path is a refrigeration side steam circuit, and the steam in the power generation side steam circuit enters the steam turbine 11 through the sixth regulating valve 201 for expansion work so as to drive the generator 12 to generate electricity, and is condensed by the second condenser 13 and pressurized by the pressurizing pump 15 and then collected in the liquid storage tank; the steam in the refrigeration side steam circuit enters the first absorption bed 3 through the second regulating valve 111, or after entering the second absorption bed 4 through the third regulating valve 121, the steam is condensed in the absorption bed for heat release, and heats the refrigeration medium of the absorption bed, so that a refrigerant is subjected to desorption and the refrigerant is driven to pass through the refrigeration cycle; the working medium steam is condensed into the liquid state and then collected in the liquid storage tank; steam condensate of the power generation side steam circuit and steam condensate of the refrigeration side steam circuit are both collected in the liquid storage tank, and then enter the backflow liquid inlet through the first regulating valve 9 and return to the underground heat pipe 1. The underground heat pipe 1 and pipelines for steam flow are both in a vacuum closed environment, and corresponding heat preservation is performed. The first regulating valve 9 is used to adjust and control a working medium amount in the underground heat pipe 1, so as to control a boiling state of the working medium in the underground heat pipe 1 according to power generation and refrigeration load conditions, so that the underground heat pipe 1 operates in the best working state.

The system changes a flow direction of the steam working medium and the refrigerant by controlling on-off of the valve assemblies to realize continuous absorption type refrigeration by using heat pipe steam; the A group valves and the B group valves are subjected to program settings: when the refrigeration cycle is closed, the A group valves and the B group valves are closed; when the refrigeration cycle works, an opening and closing relationship between the A group valves and the B group valves is determined by concentrations of the two absorption beds, when the A group valves are opened and the B group valves are closed, if the refrigerant concentration of the second absorption bed 4 is greater than the refrigerant concentration of the first absorption bed 3 by the set value X, then the B group valves are opened and the A group valves are closed; when the B group valves are opened and the A group valves are closed, if the refrigerant concentration of the first absorption bed 3 is greater than the refrigerant concentration of the second absorption bed 4 by the set value X, then the A group valves are opened and the B group valves are closed; the X value is set according to requirements of the refrigeration system; when the A group valves are opened and the B group valves are closed, the steam generated by the underground heat pipe 1 heats the first absorption bed 3, the high-temperature refrigerant steam is separated out from the first absorption bed 3, the refrigerant concentration in the bed continuously decreases, at the same time, the cooling water cools the second absorption bed 4, the refrigerant steam is absorbed in the second absorption bed 4, and the refrigerant concentration in the bed continuously increases; when the concentration of the first absorption bed 3 is reduced to be less than a set value of the second absorption bed 4, the A group valves are closed, the B group valves are opened, the steam generated by the underground heat pipe 1 heats the second absorption bed 4, the high-temperature refrigerant steam is separated out from the second absorption bed 4, the refrigerant concentration in the bed continuously decreases, at the same time, the cooling water cools the first absorption bed 3, the refrigerant steam is absorbed in the first absorption bed 3, and the refrigerant concentration in the bed continuously increases; when the concentration of the second absorption bed 4 is reduced to be less than a set value of the first absorption bed 3, the A group valves are opened, the B group valves are closed, and the cycle is repeated; and the balance valve 10 between the first absorption bed 3 and the second absorption bed 4 is used to adjust liquid levels and a concentration balance of the two absorption beds, and is closed when the refrigeration system works.

The refrigeration cycle on the refrigeration circuit side is capable of being designed and calculated according to geothermal conditions and user requirements, and an absorption type refrigeration cycle or an adsorption type refrigeration cycle is selected; the adsorption type refrigeration cycle includes a single-effect adsorption type refrigeration cycle, a dual-effect adsorption type refrigeration cycle or a multi-effect adsorption type refrigeration cycle; the absorption type refrigeration cycle includes a single-effect absorption type refrigeration cycle, a dual-effect absorption type refrigeration cycle or a multi-effect absorption type refrigeration cycle; when the absorption type refrigeration cycle is used, working media of the first absorption bed 3 and the second absorption bed 4 are a working medium pair formed by the refrigerant used to prepare the refrigeration capacity and an absorbent used to absorb and desorb the refrigerant. The absorbent includes at least one of lithium bromide, lithium chloride, lithium iodide, calcium chloride, ethylamine, methylamine, sodium thiocyanate, tetraethanol dimethyl ether or water, and the refrigerant includes water, ammonia, carbon dioxide, R134a, R12, R22 or methanol. When the adsorption type refrigeration cycle is used, each of the first absorption bed 3 and the second absorption bed 4 is an adsorption bed, the working media include the refrigerant used to prepare the refrigeration capacity and a solid adsorbent used to absorb or desorb the refrigerant, and the two form a working medium pair. The refrigerant includes water, ammonia, carbon dioxide, R134a, R12, R22 or methanol, and the solid adsorbent includes at least one of silica gel, activated alumina, zeolite molecular sieve, activated carbon or calcium chloride.

The heat utilization equipment 14 uses a cooling liquid of the second condenser 13 as a working medium to perform an open or closed cycle. The heat utilization equipment 14 uses the cooling liquid of the second condenser 13 as the working medium to perform the open or closed cycle, so as to utilize a condensation heat exchange amount of the condenser steam, and includes, but not limited to, heat users, heat pumps and other one-stage or multi-stage heat exchange equipment.

System Installation:

1) A geothermal target area is selected through geological exploration, drilling is performed from the ground to the high-temperature thermal storage, and the high-temperature thermal storage includes, but not limited to, a hydrothermal geothermal, a dry-hot rock geothermal, and an artificial thermal constructed by means of hydraulic excitation and the like.

2) The heat pipe is placed in a drilling well and fixed, heat preservation of the adiabatic section is performed, the drilling well includes, but not limited to, a vertical drilling well, an inclined drilling well and a horizontal drilling well, the heat pipe includes, but not limited to, a bare pipe, a heat pipe containing a flow guide structure and a heat pipe containing a gas-liquid separation structure, etc., and the heat preservation includes, but not limited to, an interlayer vacuumizing sleeve, an interlayer filled with silicate, rock wool, foam plastic and other porous thermal insulation materials, a nickel-plated pipe wall, aluminum foil or metal-plated polyester, a polyimide film and other thermal reflective materials.

3) The steam outlet of the underground heat pipe 1 is divided into two paths after passing through the steam pump 2, one path is connected to the inlet of a heat exchange working medium channel of the first absorption bed 3 through the second regulating valve 111, and is connected to the inlet of a heat exchange working medium channel of the second absorption bed 4 through the third regulating valve 121; sizes and structures of the first absorption bed 3 and the second absorption bed 4 are designed and calculated according to the refrigeration capacity and characteristics of the refrigerant; after passing through the absorption beds, the outlet is connected to the inlet of the sealed liquid storage tank through the first switching valve 112 and the fifth switching valve 122 respectively, a volume height of the liquid storage tank is designed and calculated according to the cycle working medium amount required by the system, and the outlet of the liquid storage tank is connected to the liquid working medium inlet (backflow liquid inlet) of the underground heat pipe 1 after passing through the first regulating valve 9. The pipelines and devices for steam circulation of the absorption beds, the liquid storage tank and the like in ground facilities are subjected to heat preservation treatment.

4) The cooling water is divided into two paths, one path is connected to the inlet of the heat exchange working medium channel of the first absorption bed 3 after passing through the fifth regulating valve 125, and the other path is connected to the inlet of the heat exchange working medium channel of the second absorption bed 4 after passing through the fourth regulating valve 115. After passing through the first absorption bed 3 and the second absorption bed 4, the two paths are converged by the switching valves (the fourth switching valve 116 and the eighth switching valve 126) and then can be selectively discharged according to use conditions, or subjected to a cooling cycle by means of a cooling tower or the like. The first absorption bed 3 and the second absorption bed 4 can simultaneously supply heat to the heat utilization equipment 14 on the power generation cycle side to cool the second condenser 13: the fourth regulating valve 115 and the fifth regulating valve 125 are connected to a cycle working medium outlet of the heat utilization equipment 14, and the fourth switching valve 116 and the eighth switching valve 126 are connected to a cycle working medium inlet of the heat utilization equipment 14.

5) Refrigerant outlets of the two absorption beds are connected to the first condenser 5 through the second switching valve 113 and the sixth switching valve 123 respectively, the first condenser 5, the electronic expansion valve 6, and the evaporator 7 are connected in sequence, and the evaporator 7 flows into refrigerant inlets of the two absorption beds through the third switching valve 114 and the seventh switching valve 124 respectively.

6) The refrigerant inlets of the two absorption beds are connected through one balance valve 10.

7) The other outlet of the steam pump 2 is connected to the steam turbine 11 through the regulating valve, and drives the generator 12 to do work, sizes and structures of the steam turbine 11 and the generator 12 are designed and calculated according to the steam volume and the power generation power, after expansion by the steam turbine 11, the steam enters the second condenser 13, a volume height and heat exchange power of the second condenser 13 are designed and calculated according to a heat exchange amount required by the system, a cooling water inlet/outlet of the second condenser 13 is connected to the inlet/outlet of the heat utilization device 14, and the heat utilization device 14 includes, but not limited to, a heat utilization user side, a cooling tower, a heat pump and the like. An outlet of the second condenser 13 is connected to the liquid storage tank after passing through the pressurizing pump 15, and the liquid storage tank is connected to the underground heat pipe 1 through the first regulating valve 9. Heat preservation treatment is performed on the pipelines and devices for steam circulation of the steam turbine 11, the condenser and the like in the ground facilities.

8) After the pipeline connection is completed, the valve assemblies on the power generation side and the refrigeration side are subjected to control settings. Note that the electronic expansion valve 6, instead of the valve assemblies, between the first condenser 5 and the evaporator 7 is used for refrigerant pressure regulation; the balance valve 10, instead of the valve assemblies, between the two absorption beds is used to balance the refrigerant concentrations of the two absorption beds, and should be closed during normal operation. The first regulating valve 9, instead of the valve assemblies, between the liquid storage tank and the underground heat pipe 1 is used to uniformly regulate the flow rate of the return liquid working medium.

The sixth regulating valve 201 between the steam pump 2 and the steam turbine 11, and the seventh regulating valve 202 and the ninth switching valve 203 between the second condenser 13 and the heat utilization device 14 are a valve group on the power generation cycle side, wherein the sixth regulating valve 201 is a flow control valve of the steam on the power generation side, and the seventh regulating valve and the ninth switching valve 203 are cooling water control valves on the power generation side; the second regulating valve 111, the first switching valve 112, the second switching valve 113, the third switching valve 114, the fourth regulating valve 115, the fourth switching valve 116, the third regulating valve 121, the fifth switching valve 122, the sixth switching valve 123, the seventh switching valve 124, the fifth regulating valve 125, and the eighth switching valve 126 are two groups of linkage valve assemblies for continuous refrigeration control on the refrigeration side and are divided into the A group and the B group for linkage control respectively. The second regulating valve 111, the first switching valve 112, the second switching valve 113, the third switching valve 114, the fourth regulating valve 115 and the fourth switching valve 116 are marked as the A group, and the third regulating valve 121, the fifth switching valve 122, the sixth switching valve 123, the seventh switching valve 124, the fifth regulating valve 125 and the eighth switching valve 126 are marked as the B group. The A group valves and B group valves are opened alternately, so that the two absorption beds alternately perform the function of absorbing and evaporating the refrigerant according to the refrigerant concentrations in the absorption beds.

The specific settings are as follows: when the refrigeration cycle is closed, the A group valves and the B group valves are closed; when the refrigeration cycle works, an opening and closing relationship between the A group valves and the B group valves is determined by concentrations of the absorption beds, when the A group valves are opened and the B group valves are closed, if the refrigerant concentration of the second absorption bed 4 is greater than the refrigerant concentration of the first absorption bed 3 by the set value X, then the B group valves are opened and the A group valves are closed; when the B group valves are opened and the A group valves are closed, if the refrigerant concentration of the first absorption bed 3 is greater than the refrigerant concentration of the second absorption bed 4 by the set value X, then the A group valves are opened and the B group valves are closed. The set value X is set according to refrigeration cycle requirements. After the valve settings are completed, respective valves are closed, the balance valve 10 between the two absorption beds is opened, the refrigerant is injected through a liquid inlet of a refrigerant channel of the first absorption bed 3 or the second absorption bed 4, and after the designed concentration is reached, the liquid inlet is closed, and the balance valve 10 is closed after the two absorption beds are balanced. The refrigeration cycle side can be designed and calculated according to the geothermal conditions and user requirements, and the absorption type refrigeration cycle or the adsorption type refrigeration cycle is selected optimally; the adsorption type refrigeration cycle includes a single-effect adsorption type refrigeration cycle, a dual-effect adsorption type refrigeration cycle or a multi-effect adsorption type refrigeration cycle; the absorption type refrigeration cycle includes a single-effect absorption type refrigeration cycle, a dual-effect absorption type refrigeration cycle or a multi-effect absorption type refrigeration cycle; when the absorption type refrigeration cycle is used, the working media of the first absorption bed 3 and the second absorption bed 4 are a working medium pair formed by the refrigerant used to prepare the refrigeration capacity and the absorbent used to absorb and desorb the refrigerant. The refrigeration working medium pair includes, but not limited to, a liquid ammonia-water solution, a lithium bromide-water solution, water-lithium chloride, water-lithium iodide, water-calcium chloride, ethylamine-water, methylamine-water, sodium thiocyanate-ammonia, methanol-lithium bromide, methanol-zinc bromide, a methanol-lithium bromide-zinc bromide ternary solution working medium pair, R21-tetraethanol dimethyl ether, and R22-tetraethanol dimethyl ether. When the adsorption type refrigeration cycle is used, each of the first absorption bed 3 and the second absorption bed 4 is an adsorption bed, the working media include the refrigerant used to prepare the refrigeration capacity and the solid adsorbent used to absorb or desorb the refrigerant, and the two form a working medium pair. The refrigeration working medium pair includes, but not limited to, molecular sieve-water, activated carbon-ammonia, calcium chloride-methanol and silica gel-water.

9) The heat pipe circuit is vacuumized through a suction valve on the underground heat pipe 1, the suction valve is closed after the required degree of vacuum is reached, the heat pipe heat-carrying working medium is injected into the liquid storage tank 8 through a water injection port, and the heat pipe heat-carrying working medium fluid includes, but not limited to, water, carbon dioxide, ammonia, and an organic working medium; if a high-pressure working medium is used, the steam pump 2 can be omitted, and the pressure and flow of the two cycles are directly adjusted by the second regulating valve 111, the third regulating valve 121 and the sixth regulating valve 201.

Use Scenario 1: Refrigeration Single Working Mode in Summer

10) The sixth regulating valve 201, the seventh regulating valve 202, and the ninth switching valve 203 of the valve group on the power generation side are closed; and an operation program set for the valve assemblies on the refrigeration cycle side is opened.

11) The heat pipe heat-carrying working medium absorbs the heat of the underground heat storage in the underground heat pipe 1 and is then vaporized, the formed steam firstly enters the first absorption bed 3 which is preset as a refrigerant desorber, is discharged into the liquid storage tank after condensation, and finally returns into the underground heat pipe 1 to form a working medium cycle of the underground heat pipe 1; the cooling water flows into the second absorption bed 4 set as the refrigerant absorbent; at the same time, in the first absorption bed 3 preset as the refrigerant desorber, the refrigerant absorbs heat and is evaporated, enters the first condenser 5, the electronic expansion valve 6 and the evaporator 7 for the refrigeration cycle, finally becomes low-pressure steam, flows into the second absorption bed 4 set as a refrigerant absorber, is absorbed and then releases heat to the cooling liquid.

12) According to the operation settings of the valve assemblies, when the refrigerant concentration in the absorption bed set as the refrigerant desorber is lower than the refrigerant concentration in the absorption bed set as the refrigerant desorber by a certain value, the opening and closing of the A group valves and the B group valves are opposite, the functions of the first absorption bed 3 and the second absorption bed 4 are exchanged, and the paths of the steam working medium, the cooling water and the refrigerant working medium are respectively changed. However, the operation of the first condenser 5, the electronic expansion valve 6 and the evaporator 7 remains unchanged. The cycle is repeated.

13) According to use requirements, the first absorption bed and the second absorption bed 4 may be connected to the heat utilization device 14 at the same time, as shown in FIG. 2, and the heat of the absorption beds is used for heat supply such as hot water supply.

14) During operation, the steam pump 2 may work together with the second regulating valve 111 and the third regulating valve 121 to adjust the pressure of steam channels of the first absorption bed 3 and the second absorption bed 4 in real time, thereby changing the steam pressure difference and the rising rate; the steam pump 2 may also be used for an auxiliary start-up process of the circuit heat pipe; by monitoring a liquid level height of the liquid storage tank, a water head of the liquid working medium in the heat pipe can be estimated, and the water head can be further controlled by the first regulating valve 9.

Use Scenario 2: Power Generation and Heating in Winter

10) All valves and valve assemblies on the refrigeration cycle side are closed, and the sixth regulating valve 201, the seventh regulating valve 202, and the ninth switching valve 203 of the valve group on the power generation side are opened; the steam turbine 11, the generator 12 and the pressurizing pump 15 are started.

11) The steam of the steam pump 2 is injected into the steam turbine 11 through the sixth regulating valve 201 to do work, and drives the electricity generator 12 to generate electricity. After expansion of the steam turbine 11, the steam enters the second condenser 13, and is condensed into a liquid state by cooling water input from the heat utilization device 14. The condensate is pressurized by the pressurizing pump 15, then flows into the liquid storage tank to be collected, and then returns into the underground heat pipe 1 through the first regulating valve 9. The heat utilization device 14 can use the condensation heat of the steam in the second condenser 13 to supply heat to the user.

12) During operation, the steam pump 2 may work together with the sixth regulating valve 201 to adjust the steam flow and pressure of the steam turbine 11 in real time, thereby changing the steam pressure difference and the rising rate; the steam pump 2 may also be used for the auxiliary start-up process of the circuit heat pipe; by monitoring the liquid level height of the liquid storage tank, the water head of the liquid working medium in the underground heat pipe 1 can be estimated, and the water head can be further controlled by the first regulating valve 9; and the seventh regulating valve 202 controls a cycle working medium flow of the heat utilization device 14.

Use Scenario 3: Refrigeration/Power Generation Dual Working Mode

10) All valves and valve assemblies on the refrigeration cycle side are opened, and the sixth regulating valve 201, the seventh regulating valve 202, and the ninth switching valve 203 of the valve group on the power generation side are opened; and the steam turbine 11, the generator 12 and the pressurizing pump 15 are opened.

11) The heat pipe heat-carrying working medium absorbs the heat stored in the underground heat pipe 1 and is then vaporized, and is divided into two paths at the outlet of the steam pump 2, the steam of one path firstly enters the first absorption bed 3 which is preset as the refrigerant desorber, is discharged into the liquid storage tank after condensation, and finally returns to the underground heat pipe 1 to form the working medium cycle of the heat pipe; the cooling water flows into the second absorption bed 4 set as the refrigerant absorbent; at the same time, in the first absorption bed 3 set as the refrigerant desorber, the refrigerant absorbs heat and is evaporated, enters the first condenser 5, the electronic expansion valve 6 and the evaporator 7 for the refrigeration cycle, and finally becomes low-pressure steam, which flows into the second absorption bed 4 set as the refrigerant absorber and releases heat to the cooling water after being absorbed. According to the operation settings of the valve assemblies, when the refrigerant concentration in the absorption bed set as the refrigerant desorber is lower than the refrigerant concentration in the absorption bed set as the refrigerant desorber by the set value, the opening and closing of the valve assemblies are opposite, the functions of the first absorption bed 3 and the second absorption bed 4 are exchanged, and the paths of the steam working medium, the cooling water and the refrigerant working medium are respectively changed. However, the operation of the first condenser 5, the electronic expansion valve 6 and the evaporator 7 remains unchanged. The cycle is repeated.

12) After the steam pump 2, the steam of the other path is injected into the steam turbine 11 through the sixth regulating valve 201 to do work, and drives the generator 12 to generate electricity. After expansion of the steam turbine 11, the steam enters the second condenser 13 and is condensed into a liquid state by the cooling water input from the heat utilization equipment 14. The condensate is pressurized by the pressurizing pump 15, then flows into the liquid storage tank for collection, and then returns into the underground heat pipe 1 through the first regulating valve 9.

13) During operation, the evaporator 7, the generator 12 and the heat utilization equipment 14 provide refrigeration supply, power supply and heating to the user respectively. The steam pump 2 is used for real-time adjustment of the steam flow and pressure of the entire combined cooling power and heating system, and the steam pressure difference and the rising rate in the heat pipe are changed at the same time; the steam pump 2 may also be used for the auxiliary start-up process of the circuit heat pipe; the sixth regulating valve 201 between the steam pump 2 and the steam turbine 11 is used to control the flow and pressure of the steam entering the power generation cycle side; the steam pump 2 and the second regulating valve 111 and the third regulating valve 121 between the first absorption bed and the second absorption bed 4 are used to control the flow and pressure of the steam entering the refrigeration cycle side. According to the use requirements, the steam flows of the two cycles are distributed through the above steam pump 2 and three regulating valves (the sixth regulating valve 201, the second regulating valve 111 and the third regulating valve 121), thereby regulating the refrigeration/power generation capacity.

14) The condensate on the refrigeration and power generation cycle sides is collected in the same liquid storage tank. By monitoring the liquid level height of the liquid storage tank, the water head of the liquid working medium in the heat pipe can be estimated, and the water head can be further controlled by the first regulating valve 9.

The above detailed description is a specific description of feasible embodiments of the present invention, and the embodiments are not intended to limit a patent scope of the present invention. Any equivalent implementations or modifications made without departing from the present invention should be included in the patent scope of this case.

What is claimed is:

1. A heat-pipe type heat extraction integrated with combined cooling power and heating exploitation-utilization integrated geothermal system, comprising an underground heat pipe, a steam pump, a first absorption bed, a second absorption bed, a first condenser, an electronic expansion valve, an evaporator, a liquid storage tank, a balance valve, a steam turbine, an electricity generator connected to the steam turbine, a second condenser, a heat utilization equipment connected to the second condenser, a pressurizing pump connected to the second condenser, and relevant linkage valve assemblies;
   wherein the underground heat pipe comprises an evaporation section, an adiabatic section and a reflux section, and the evaporation section is located in an underground high-temperature thermal storage;
   a top of the reflux section is located on the ground and is provided with a suction hole, a steam outlet and a liquid return inlet;
   the underground heat pipe uses at least one selected from the group consisting of water, carbon dioxide, ammonia, and an organic working medium as a heat-carrying working medium, or the underground heat pipe uses a nanofluid formed by adding metal oxide nanoparticles to the at least one selected from the group consisting of water, carbon dioxide, ammonia, and the organic working medium as the heat-carrying working medium;
   the steam outlet of the underground heat pipe is connected to the steam pump, and the backflow liquid inlet of the underground heat pipe is connected to the liquid storage tank;
   the first absorption bed, the second absorption bed and the steam turbine are connected to an outlet of the steam pump, and a steam outlet of the steam turbine is connected to the second condenser;
   the first absorption bed, the second absorption bed and the pressurizing pump are connected to the liquid storage tank;
   the first condenser, the electronic expansion valve and the evaporator are connected end-to-end in sequence, and the first absorption bed and the second absorption bed are respectively connected to the first condenser;
   an outlet of the evaporator is connected to the first absorption bed and the second absorption bed respectively; and
   the first absorption bed is connected to the second absorption bed through the balance valve.

2. The heat-pipe type heat extraction integrated with combined cooling power and heating exploitation-utilization integrated geothermal system according to claim 1, wherein the outlet of the steam pump is divided into two paths, wherein a first path of the two paths is connected to a refrigeration circuit side, and a second path of the two paths is connected to a power generation cycle side;

the relevant linkage valve assemblies comprise a first regulating valve, a second regulating valve, a third regulating valve, a fourth regulating valve, a fifth regulating valve, a sixth regulating valve, a seventh regulating valve, a first switching valve, a second switching valve, a third switching valve, a fourth switching valve, a fifth switching valve, a sixth switching valve, a seventh switching valve, an eighth switching valve and a ninth switching valve;

the first absorption bed, the second absorption bed, the first condenser, the electronic expansion valve, the evaporator, the liquid storage tank, the balance valve, the second regulating valve, the first switching valve, the second switching valve, the third switching valve, the fourth regulating valve, the fourth switching valve, the third regulating valve, the fifth switching valve, the sixth switching valve, the seventh switching valve, the fifth regulating valve and the eighth switching valve form the refrigeration circuit side;

each of the first absorption bed and the second absorption bed is provided with a heat exchange working medium flow channel and a refrigerant flow channel;

the heat exchange working medium flow channel of the first absorption bed is provided with two inlets, wherein a first inlet of the two inlets is connected to the outlet of the steam pump through the second regulating valve, and a second inlet of the two inlets is connected to a cooling water pipeline through the eighth switching valve;

the heat exchange working medium flow channel of the first absorption bed is provided with two outlets, wherein a first outlet of the two outlets is connected to the liquid storage tank through the first switching valve, and a second outlet of the two outlets is connected to a cooling water discharge pipeline through the fifth regulating valve;

the heat exchange working medium flow channel of the second absorption bed is provided with two inlets, wherein a first inlet of the two inlets is connected to the outlet of the steam pump through the third regulating valve, and a second inlet of the two inlets is connected to the cooling water pipeline through the fifth regulating valve;

the heat exchange working medium flow channel of the second absorption bed is provided with two outlets, wherein a first outlet of the two outlets is connected to the liquid storage tank through the fifth switching valve, and a second outlet of the two outlets is connected to the cooling water discharge pipeline through the fourth regulating valve;

the refrigerant flow channel of the first absorption bed is provided with two refrigerant inlets/outlets, a first inlet/outlet of the two refrigerant inlets/outlets is connected to the first condenser through the second switching valve, and a second inlet/outlet of the two refrigerant inlets/outlets is connected to the evaporator through the seventh switching valve;

the refrigerant flow channel of the second absorption bed is provided with two refrigerant inlets/outlets, a first inlet/outlet of the two refrigerant inlets/outlets is connected to the first condenser through the sixth switching valve, and a second inlet/outlet of the two refrigerant inlets/outlets is connected to the evaporator through the third switching valve;

an outlet of the liquid storage tank is connected to the liquid return inlet of the underground heat pipe through the first regulating valve;

the second regulating valve, the first switching valve, the second switching valve, the third switching valve, the fourth regulating valve and the fourth switching valve are marked as A group valves;

the third regulating valve, the fifth switching valve, the sixth switching valve, the seventh switching valve, the fifth regulating valve and the eighth switching valve are marked as B group valves;

when a refrigeration cycle does not work, the A group valves and the B group valves are all closed;

when the refrigeration cycle works, the A group valves and the B group valves are set according to a program, and when a first group of the A group valves and the B group valves is open, a second group of the A group valves and the B group valves is closed;

when the A group valves are opened, the B group valves are closed, a steam generated by the underground heat pipe enters the first absorption bed through the second regulating valve, releases heat to be condensed into a liquid state, flows into the liquid storage tank through the first switching valve, and returns to the underground heat pipe through the first regulating valve, at the same time, a refrigeration medium of the first absorption bed absorbs heat to separate out a high-temperature refrigerant steam, the high-temperature refrigerant steam enters the first condenser through the second switching valve to release heat for condensation and forms a high-pressure liquid state, the high-pressure liquid state is depressurized through the electronic expansion valve, enters the evaporator to absorb heat for refrigeration, is vaporized into a gaseous state, and finally flows to the second absorption bed through the third switching valve to be absorbed for heat release, cooling water flowing in through the fourth regulating valve is heated, and the cooling water is heated and flows out from the fourth switching valve;

when a concentration of the first absorption bed is less than a set value X of the absorption bed, the A group valves are closed, the B group valves are opened, the steam generated by the underground heat pipe enters the second absorption bed through the third regulating valve, releases heat to be condensed into a liquid state, flows into the liquid storage tank through the fifth switching valve, and returns to the underground heat pipe through the first regulating valve, at the same time, a refrigeration medium of the second absorption bed absorbs heat to separate out a high-temperature refrigerant steam, the high-temperature refrigerant steam enters the first condenser through the sixth switching valve to release heat for condensation and forms a high-pressure liquid state, the high-pressure liquid state is depressurized through the electronic expansion valve, enters the evaporator to absorb heat for refrigeration, is vaporized into a gaseous state, and flows to the first absorption bed through the seventh switching valve to be absorbed for heat release, and cooling water flowing in through the fifth regulating valve is heated, and the cooling water is heated and then flows out from the eighth switching valve.

3. The heat-pipe type heat extraction integrated with combined cooling power and heating exploitation-utilization integrated geothermal system according to claim 2, wherein the steam turbine, the generator, the second condenser, the heat utilization equipment, the seventh regulating valve, the ninth switching valve and the pressurizing pump form the power generation cycle side;

the outlet of the steam pump is connected to the steam turbine through the sixth regulating valve;

a cooling water inlet of the second condenser is connected to an outlet of the heat utilization equipment through the seventh regulating valve, and a cooling water outlet of the second condenser is connected to an inlet of the heat utilization equipment through the ninth switching valve; and a condensed water outlet of the second condenser is connected to the liquid storage tank through the pressurizing pump.

4. The heat-pipe type heat extraction integrated with combined cooling power and heating exploitation-utilization integrated geothermal system according to claim 2, wherein the system uses a working medium steam generated in the underground heat pipe as a cycle working medium to perform a refrigeration and electric heating dual-mode heat utilization;

after the underground heat pipe absorbs heat of the underground high-temperature thermal storage, the working medium steam is divided into two paths, wherein a first path of the two paths is a power generation side steam circuit, a second path of the two paths is a refrigeration side steam circuit, and the steam in the power generation side steam circuit enters the steam turbine through the sixth regulating valve for expansion work so as to drive the electricity generator to generate electricity and is condensed by the second condenser and pressurized by the pressurizing pump and collected in the liquid storage tank;

the steam in the refrigeration side steam circuit enters the first absorption bed through the second regulating valve, or after entering the second absorption bed through the third regulating valve, the steam is condensed in the absorption bed for heat release and heats the refrigeration medium of the absorption bed, wherein a refrigerant is subjected to desorption and the refrigerant is driven to pass through the refrigeration cycle;

the working medium steam is condensed into the liquid state and collected in the liquid storage tank;

a steam condensate of the power generation side steam circuit and a steam condensate of the refrigeration side steam circuit are collected in the liquid storage tank and enter the liquid return inlet through the first regulating valve and return to the underground heat pipe.

5. The heat-pipe type heat extraction integrated with combined cooling power and heating exploitation-utilization integrated geothermal system according to claim 2, wherein the system changes a flow direction of the steam working medium and the refrigerant by controlling on-off of the relevant linkage valve assemblies to realize a continuous absorption type refrigeration by using a heat pipe steam;

the A group valves and the B group valves are subjected to program settings:

when the refrigeration cycle is closed, the A group valves and the B group valves are closed;

when the refrigeration cycle works, an opening and closing relationship between the A group valves and the B group valves is determined by refrigerant concentrations of the two-first and second absorption beds, when the A group valves are opened and the B group valves are closed, if the refrigerant concentration of the second absorption bed is greater than the refrigerant concentration of the first absorption bed by the set value X, then the B group valves are opened and the A group valves are closed;

when the B group valves are opened and the A group valves are closed, if the refrigerant concentration of the first absorption bed is greater than the refrigerant concentration of the second absorption bed by the set value X, then the A group valves are opened and the B group valves are closed; the X value is set according to requirements of the refrigeration system;

when the A group valves are opened and the B group valves are closed, the steam generated by the underground heat pipe heats the first absorption bed, the high-temperature refrigerant steam is separated out from the first absorption bed, the refrigerant concentration in the first absorption bed continuously decreases, at the same time, the cooling water cools the second absorption bed, the refrigerant steam is absorbed in the second absorption bed, and the refrigerant concentration in the second absorption bed continuously increases;

when the refrigerant concentration of the first absorption bed is reduced to be less than a set value of the second absorption bed, the A group valves are closed, the B group valves are opened, the steam generated by the underground heat pipe heats the second absorption bed, the high-temperature refrigerant steam is separated out from the second absorption bed, the refrigerant concentration in the second absorption bed continuously decreases, at the same time, the cooling water cools the first absorption bed, the refrigerant steam is absorbed in the first absorption bed, and the refrigerant concentration in the first absorption bed continuously increases;

when the refrigerant concentration of the second absorption bed is reduced to be less than a set value of the first absorption bed, the A group valves are opened, the B group valves are closed, and the cycle is repeated; and the balance valve between the first absorption bed and the second absorption bed is configured to adjust liquid levels and a concentration balance of the first and second absorption beds and is closed when the refrigeration system works.

6. The heat-pipe type heat extraction integrated with combined cooling power and heating exploitation-utilization integrated geothermal system according to claim 2, wherein the refrigeration cycle on the refrigeration circuit side is configured for being designed and calculated according to geothermal conditions and user requirements, and an absorption type refrigeration cycle or an adsorption type refrigeration cycle is selected;

when the absorption type refrigeration cycle is configured, the first absorption bed and the second absorption bed use a liquid absorbent-refrigerant combination as a first refrigeration medium pair;

the absorption type refrigeration cycle comprises a single-effect absorption type refrigeration cycle, a dual-effect absorption type refrigeration cycle or a multi-effect absorption type refrigeration cycle;

when the adsorption type refrigeration cycle is configured, each of the first absorption bed and the second absorption bed is an adsorption bed, and the first and second absorption beds use a solid adsorbent-refrigerant combination as a second refrigeration medium pair; and the adsorption type refrigeration cycle comprises a single-effect adsorption type refrigeration cycle, a dual-effect adsorption type refrigeration cycle or a multi-effect adsorption type refrigeration cycle.

7. The heat-pipe type heat extraction integrated with combined cooling power and heating exploitation-utilization integrated geothermal system according to claim 2, wherein the heat utilization equipment performs an open or closed cycle with the cooling water of the second condenser as the heat-carrying working medium.

* * * * *